(12) United States Patent
Lin

(10) Patent No.: US 8,944,443 B2
(45) Date of Patent: Feb. 3, 2015

(54) FOLDABLE GOLF BAG CART

(71) Applicant: Macauto Industrial Co., Ltd., Tainan (TW)

(72) Inventor: Paul Lin, Tainan (TW)

(73) Assignee: Macauto Industrial Co., Ltd., Tainan (TW)

( * ) Notice: Subject to any disclaimer, the term of this patent is extended or adjusted under 35 U.S.C. 154(b) by 0 days.

(21) Appl. No.: 14/053,788

(22) Filed: Oct. 15, 2013

(65) Prior Publication Data
US 2014/0125038 A1    May 8, 2014

(30) Foreign Application Priority Data
Nov. 5, 2012   (TW) ............................. 101221381 U (51) Int. Cl.
| B62D 61/06 | (2006.01) |
| B62D 61/08 | (2006.01) |
| B62B 3/02 | (2006.01) |
| B62B 3/12 | (2006.01) |
| A63B 55/08 | (2006.01) |

(52) U.S. Cl.
CPC ................. *A63B 55/087* (2013.01); *B62B 3/02* (2013.01); *A63B 2210/50* (2013.01)
USPC ............. 280/62; 280/47.34; 280/639; 280/42

(58) Field of Classification Search
CPC .. B62B 2202/404; B62B 5/0083; B62B 3/12; B62B 3/104; B62B 3/04; B62B 7/044; B62B 7/068; A63B 55/08; A63B 55/087; A63B 2055/088
USPC ............... 280/47.34, 62, 638, 47.11; 180/908
See application file for complete search history.

(56) References Cited

U.S. PATENT DOCUMENTS

| 2,574,232 | A | * | 11/1951 | Welsh | ............................. 280/42 |
| 2,717,785 | A | * | 9/1955 | Ray | ................................ 280/646 |
| 2,936,182 | A | * | 5/1960 | Williamson | .................. 280/646 |
| 5,087,040 | A | * | 2/1992 | Wu | ................................. 280/646 |
| 6,182,983 | B1 | * | 2/2001 | Kim | ........................... 280/47.26 |
| 6,481,518 | B1 | * | 11/2002 | Wu | ................................ 180/65.6 |
| 7,591,479 | B2 | * | 9/2009 | Golias | ........................... 280/647 |
| 8,042,828 | B2 | * | 10/2011 | Ageneau et al. | ............. 280/642 |
| 2006/0267303 | A1 | * | 11/2006 | Golias | ........................ 280/47.34 |
| 2008/0054579 | A1 | * | 3/2008 | Liu | ................................. 280/35 |
| 2010/0187035 | A1 | * | 7/2010 | Lin | ................................ 180/211 |
| 2014/0196967 | A1 | * | 7/2014 | Chang et al. | .................. 180/167 |

* cited by examiner

*Primary Examiner* — J. Allen Shriver, II
*Assistant Examiner* — Travis Coolman
(74) *Attorney, Agent, or Firm* — DLA Piper LLP (US)

(57) ABSTRACT

A foldable golf bag cart includes a connecting seat that has two tubular walls, each of which is formed with an interior pivot hole and a swing hole, and a positioning member that is movably mounted on a rear wheel leg. The swing hole has a swing section, an abutment section, and an insert section. When the positioning member is moved in the insert section, the rear wheel leg is pushed into the abutment section so that the rear wheel leg is prevented from moving forwardly and rearwardly. When the positioning member is disengaged from the insert section, the rear wheel leg extends into the swing section and is movable forwardly to a folded position.

10 Claims, 9 Drawing Sheets

FOLDABLE GOLF BAG CART

CROSS-REFERENCE TO RELATED APPLICATION

This application claims priority of Taiwanese Application No. 101221381, filed on Nov. 5, 2012.

BACKGROUND OF THE INVENTION

1. Field of the Invention

The invention relates to a golf cart, more particularly to a foldable golf bag cart for carrying a golf bag.

2. Description of the Related Art

In recent years, golf has become a popular sport. When playing golf, a golf player usually has a set of golf clubs to meet various requirements of a golf course terrain. Therefore, a golf bag that accommodates the golf clubs is relatively heavy, making it inconvenient to carry the golf bag around the golf course terrain. In order to reduce such inconvenience, a golf bag cart has been developed to support and transport the golf bag. However, in addition to a relatively high fabrication cost, the conventional golf bag cart has a complicated foldable structure and that makes it to fold.

SUMMARY OF THE INVENTION

Therefore, the object of the present invention is to provide a foldable golf bag cart that can overcome the aforesaid drawbacks of the prior art.

Accordingly, a foldable golf bag cart of the present invention comprises a front wheel mechanism and a pair of rear wheel mechanisms.

The front wheel mechanism includes a cart frame that has a front wheel, and a connecting seat mounted on the cart frame rearwardly of the front wheel. The connecting seat has two spaced-apart left and right tubular walls that are disposed respectively at left and right sides of the cart frame, two interior pivot holes that are respectively defined by the left and right tubular walls, and two swing holes that respectively extend through the left and right tubular walls and are communicated with the interior pivot holes. Each of the swing holes has a swing section that extends arcuately from a bottom part to a front part of a corresponding one of the left and right tubular walls, an abutment section that opens downward and that communicates with one side of a bottom part of the swing section, and an insert section that opens downward and that communicates with another side of the bottom part of the swing section oppositely of the abutment section. The abutment sections of the swing holes are proximate to the left and right sides of the cart frame, respectively. The insert sections are disposed between the abutment sections.

Each of the rear wheel mechanisms includes a rear wheel leg that has an upper portion inserted pivotally into one of the interior pivot holes through a corresponding one of the swing holes, a positioning member that is movably mounted on the rear wheel leg to move upward or downward and that is releasably insertable into the insert section of the corresponding one of the swing holes, and a rear wheel attached to the rear wheel leg.

When the positioning member is moved upward and wedged in the insert section of the corresponding one of the swing holes, the rear wheel leg is pushed to incline sidewardly and into the abutment section of the corresponding one of the swing holes so that the rear wheel leg is prevented from moving forwardly and rearwardly.

When the positioning member is moved downward and is disengaged from the insert section of the corresponding one of the swing holes, the rear wheel leg extends into the swing section and is movable forwardly to a folded position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
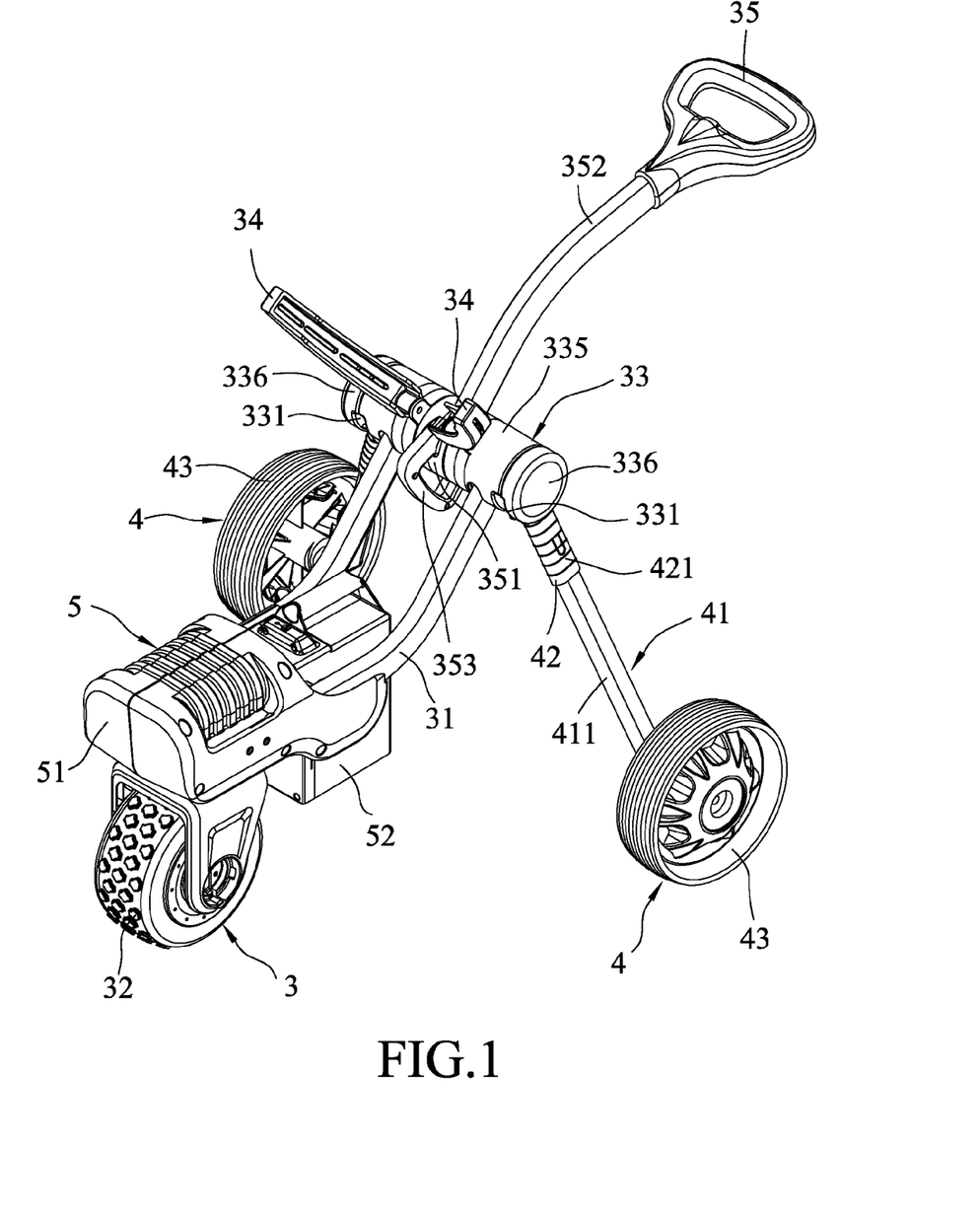
FIG. 1 is a perspective view illustrating the preferred embodiment of a foldable golf bag cart according to the present invention in an unfolded state.
Figure 2:
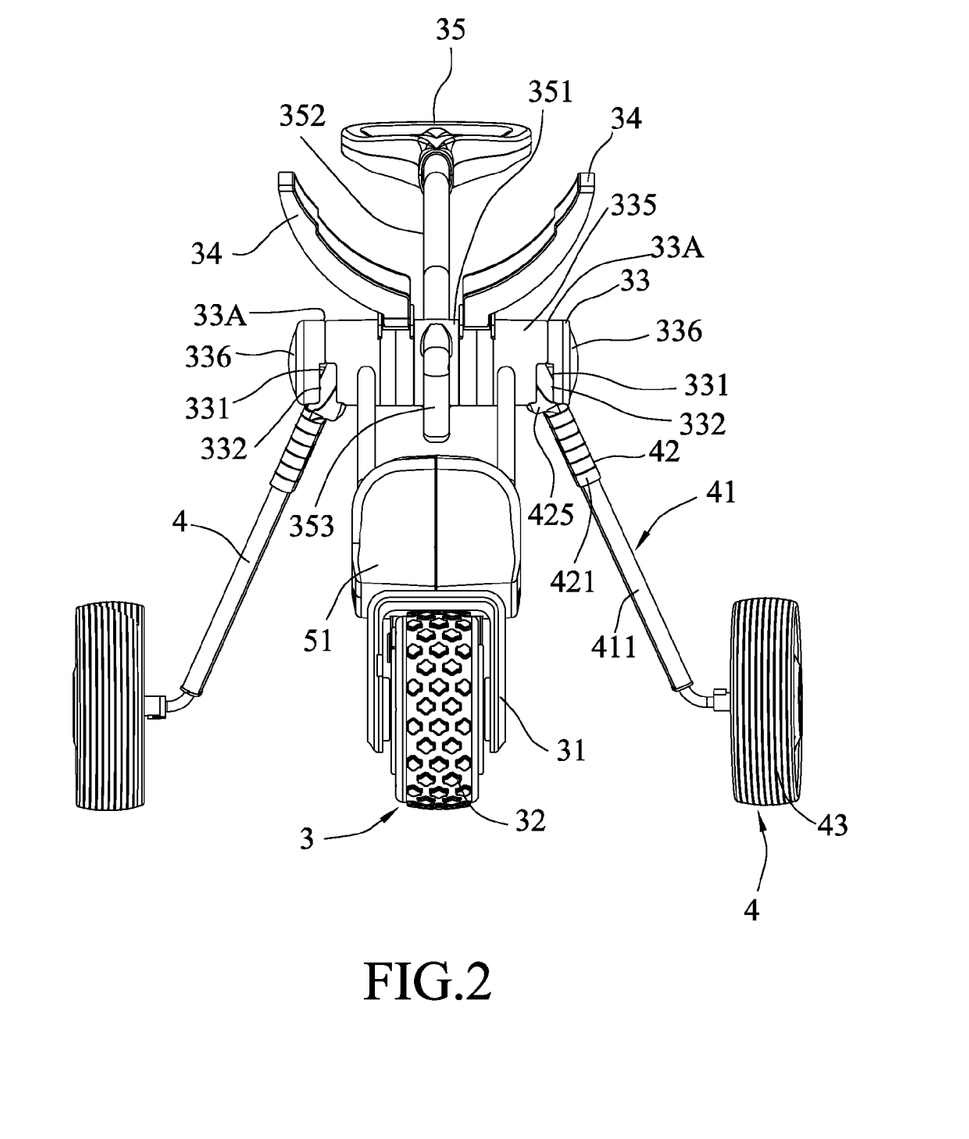
FIG. 2 is a front view of the preferred embodiment of the foldable golf bag cart in the unfolded state.
Figure 3:
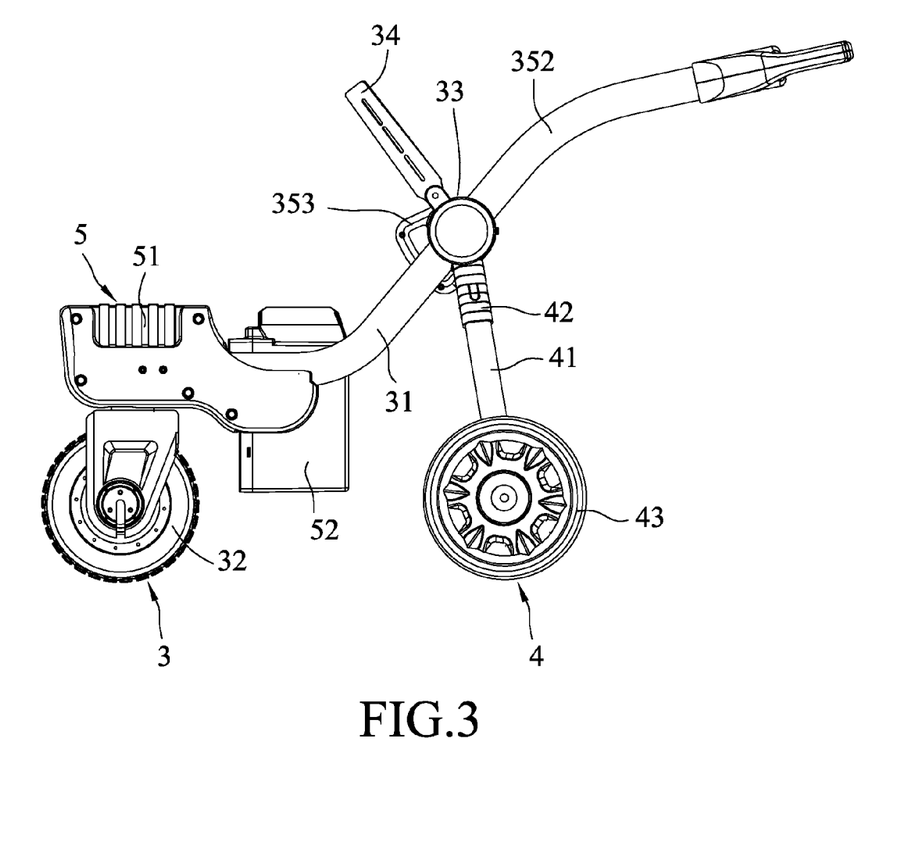
FIG. 3 is a side view of the preferred embodiment of the foldable golf bag cart in the unfolded state.

As shown in FIGS. 1 to 3, the preferred embodiment of a foldable golf bag cart according to the present invention is illustrated. The foldable golf bag cart is adapted to carry a golf bag and comprises a front wheel mechanism 3 and a pair of rear wheel mechanisms 4.

The front wheel mechanism 3 includes a cart frame 31 that has a front wheel 32, and a connecting seat 33 that is mounted on the cart frame 31 rearwardly of the front wheel 32.

Referring to FIG. 2, the connecting seat 33 has two spaced-apart left and right tubular walls 33A that are disposed respectively at left and right sides of the cart frame 31. Further referring to FIGS. 4, 5 and 6, the rear wheel mechanisms 4 and the tubular walls 33A have a symmetric structure with respect to the left and right sides of the cart frame 31, and only the right tubular wall 33A at the right side of the cart frame 31 and the corresponding rear wheel mechanism 4 are shown to illustrate the structural relationship therebetween.

Figure 4:
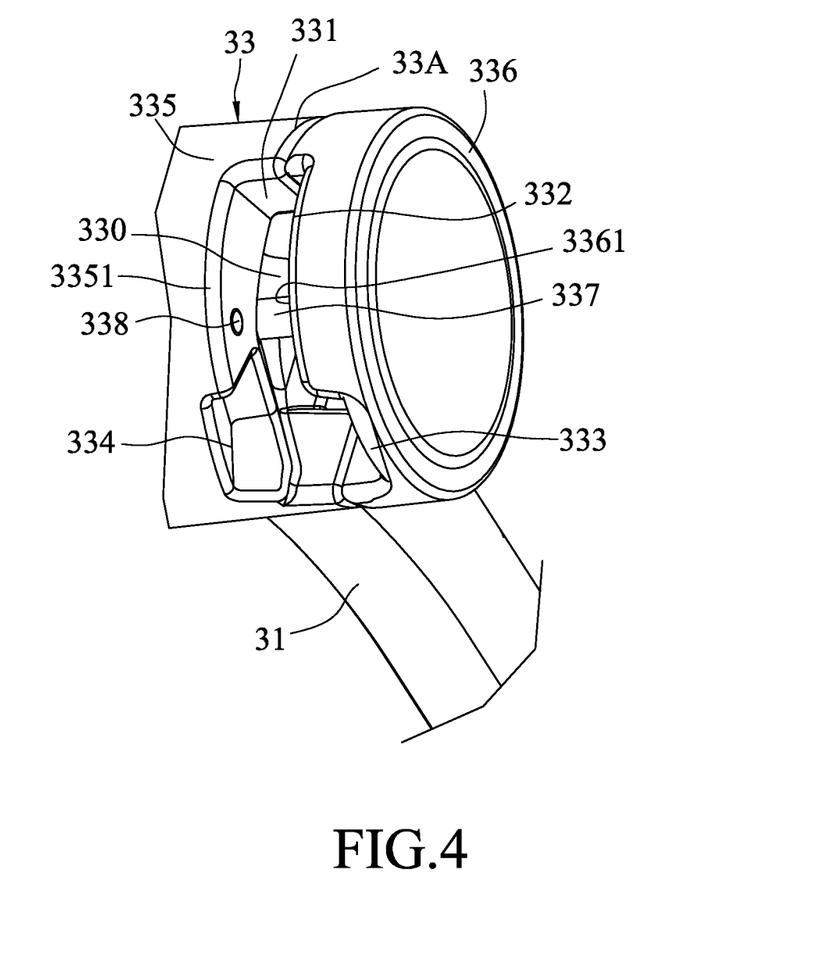
FIG. 4 is a fragmentary perspective view illustrating a connecting seat of the preferred embodiment of the foldable golf bag cart.
Figure 5:
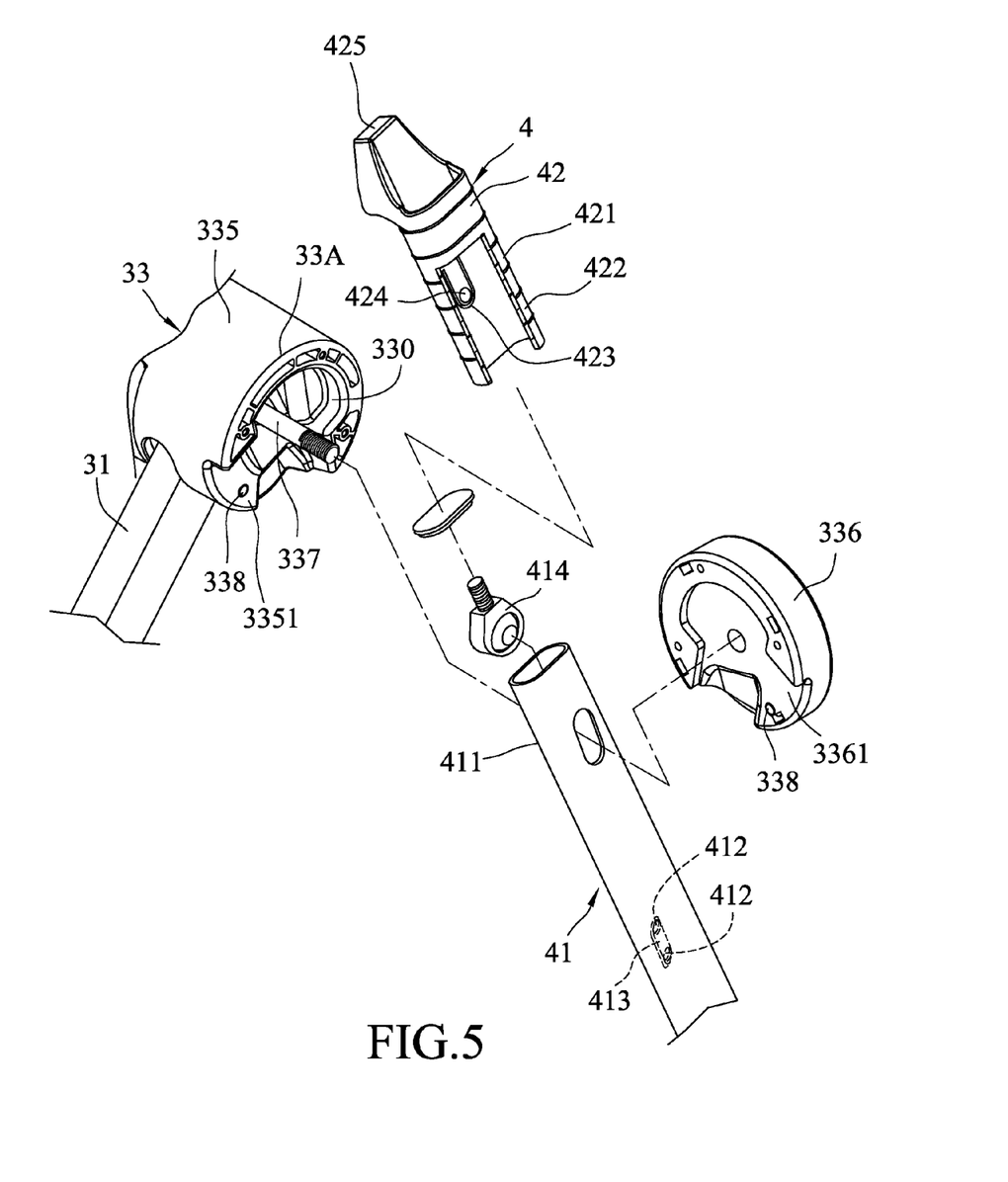
FIG. 5 is a fragmentary exploded view illustrating the preferred embodiment of the foldable golf bag cart.
Figure 6:
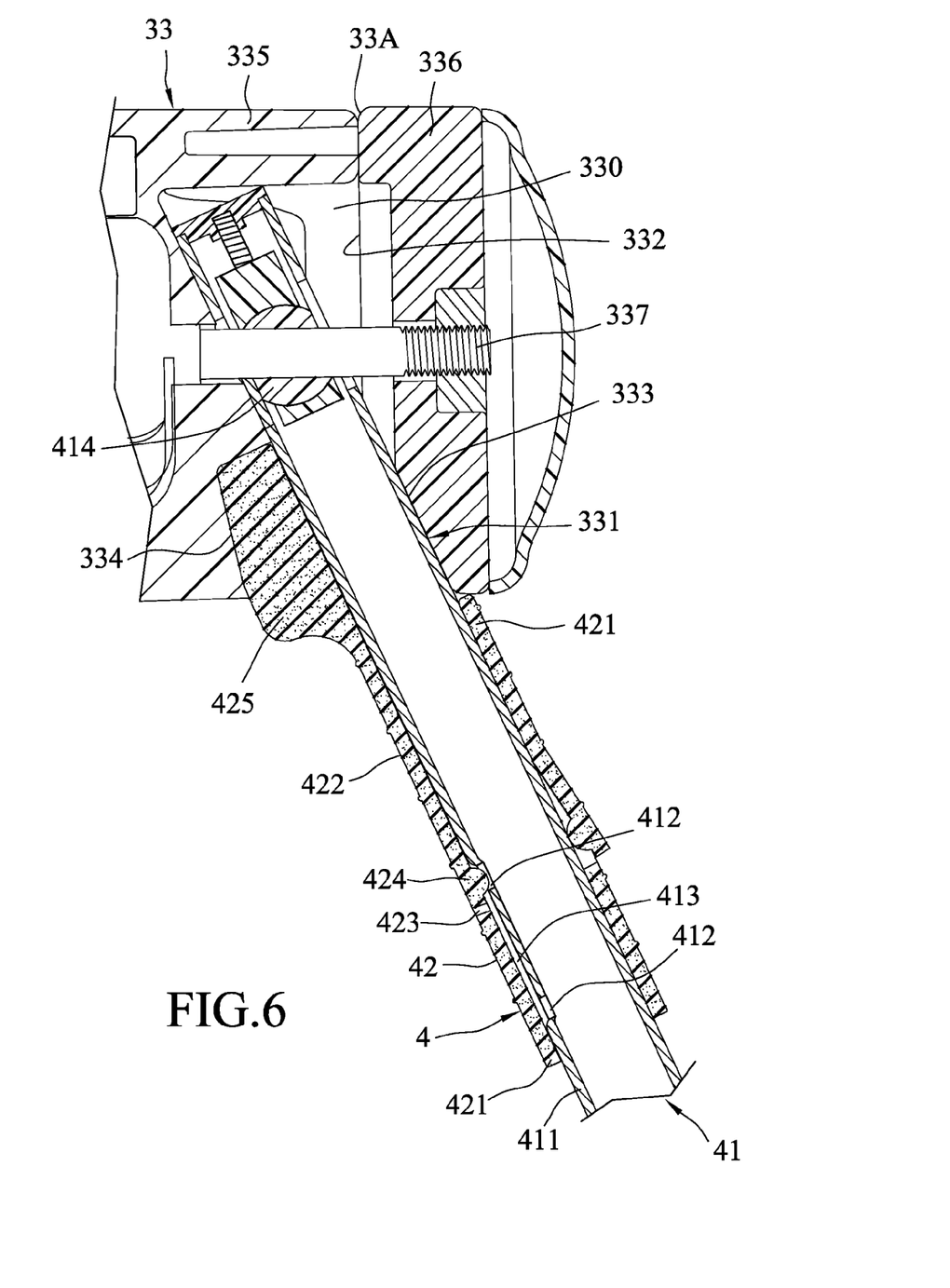
FIG. 6 is a fragmentary sectional view illustrating engagement between one of rear wheel mechanisms and the connecting seat of the preferred embodiment of the foldable golf bag cart in the unfolded state.

The connecting seat 33 further has an interior pivot hole 330 that is defined by the right tubular wall 33A, and a swing hole 331 that extends through the right tubular wall 33A and is communicated with the interior pivot hole 330. The swing hole 331 has a swing section 332 that extends arcuately from a bottom part to a front part of the right tubular wall 33A, an abutment section 333 that opens downward and that communicates with one side of a bottom part of the swing section 332, and an insert section 334 that opens downward and that communicates with another side of the bottom part of the swing section 332 oppositely of the abutment section 333.

The abutment section 333 of the swing hole 331 is proximate to the right side of the cart frame 31. In this preferred embodiment, the abutment section 333 of the swing hole 331 has a width that is measured from the swing section 332 in a left-right direction and that is increased gradually from an inner surface to an outer surface of the right tubular wall 33A. The insert section 334 of the swing hole 331 has a width that is measured from the swing section 332 in the left-right direction and that is decreased from the inner surface to the outer surface of the right tubular wall 33A. Referring back to FIG. 2, considering the entire connecting seat 33, the insert sections 334 are disposed between the abutment sections 333.

The rear wheel mechanism 4 includes a rear wheel leg 41 that has an upper portion inserted pivotally into the interior pivot hole 330 through the swing hole 331, a positioning member 42 that is movably mounted on the rear wheel leg 41 to move upward or downward and that is releasably insertable into the insert section 334 of the swing hole 331, and a rear wheel 43 attached to the rear wheel leg 41. When the positioning member 42 is moved upward and wedged in the insert section 334 of the swing hole 331, the rear wheel leg 41 is pushed to incline sidewardly relative to the cart frame 31 and into the abutment section 333 of the swing hole 331 so that the rear wheel leg 41 is prevented from moving forwardly and rearwardly. When the positioning member 42 is moved downward and is disengaged from the insert section 334 of the swing hole 331, the rear wheel leg 41 extends into the swing section 332 without inclining relative to the cart frame 31 and is movable forwardly to a folded position.

In this preferred embodiment, the positioning member 42 of the rear wheel mechanism 4 has an adjusting section 421 that is slidably sleeved around an outer surface of the rear wheel leg 41 of the rear wheel mechanism 4, and an engaging section 425 that is eccentrically disposed at and outwardly protruded from a top end of the adjusting section 421 and that is able to be inserted in the insert section 334 of the swing hole 331. The rear wheel leg 41 of the rear wheel mechanism 4 is pushed to incline sidewardly and into the abutment section 333 when the engaging section 425 is engaged in the insert section 334. In this preferred embodiment, the engaging section 425 of the positioning member 42 has a top end distal from the adjusting section 421 and has a width that is measured from the top end of the engaging section 425 in the left-right direction and that is increased gradually and downwardly from the top end of the engaging section 425. The width of the insert section 334 at the outer surface of the right tubular wall 33A is smaller than the width of the engaging section 425 at the top end of the engaging section 425.

Preferably, the connecting seat 33 further includes a pivot shaft 337 that extends in the left-right direction and that is inserted through the interior pivot hole 330 defined by the right tubular wall 33A. The rear wheel leg 41 of the rear wheel mechanism 4 includes a tubular leg body 411 that is upwardly inserted in the swing hole 331 and the interior pivot hole 330, and a universal joint bearing 414 that is mounted on top of the tubular leg body 411 and that is swingably sleeved around the pivot shaft 337. The universal joint bearing 414 permits a top end of the tubular leg body 411 to be swingable in the swing hole 331 and the interior pivot hole 330. The tubular leg body 411 has two positioning holes 412 that are indented in an outer surface of the tubular leg body 411 and that are spaced apart from each other in a lengthwise direction of the tubular leg body 411. The adjusting section 421 of the positioning member 42 of the rear wheel mechanism 4 has a sleeve portion 422 that is slidably sleeved around the outer surface of the tubular leg body 411 of the rear wheel leg 41 of the rear wheel mechanism 4 and that has an opening 423 exposing outwardly the positioning holes 412, and a resilient engaging portion 424 that extends into the opening 423 to engage releasably a selected one of the positioning holes 412.

In this preferred embodiment, the tubular leg body 411 of the rear wheel mechanism 4 further has an indented region 413 that is indented in the outer surface of the tubular leg body 411. The positioning holes 412 are formed in the indented region 413. The indented region 413 permits the resilient engaging portion 424 to slide therein and to move between the positioning holes 412. Hence, the sleeve portion 422 and the engaging section 425 of the positioning member 42 are movably adjusted relative to the tubular leg body 411 of the rear wheel mechanism 4. Preferably, the connecting seat 33 further has a pair of limit protrusions 338 that project oppositely and into the swing section 332 of the swing hole 331. The tubular leg body 411 of the rear wheel mechanism 4 is able to move past the limit protrusions 338 when being pushed to pivot forwardly to reach the folded position. The limit protrusions 338 prevent a rearward pivoting movement of the tubular leg body 411 from the folded position.

As shown in FIGS. 4 and 6, when the rear wheel mechanism 4 is in an unfolded state, the resilient engaging portion 424 of the positioning member 42 engages the selected one of the positioning holes 412 of the tubular leg body 411 of the rear wheel mechanism 4. Since the engaging section 425 is engaged in the insert section 334 of the swing hole 331, the tubular leg body 411 is pushed to incline sidewardly and engaged in the abutment section 333 of the swing hole 331. Consequently, as shown in FIG. 2, the tubular leg bodies 411 are downwardly distant from each other in the left-right direction relative to the connecting seat 33, such that the rear wheels 43 are distal from each other rearwardly of the front wheel 32 in the left-right direction.

Figure 7:
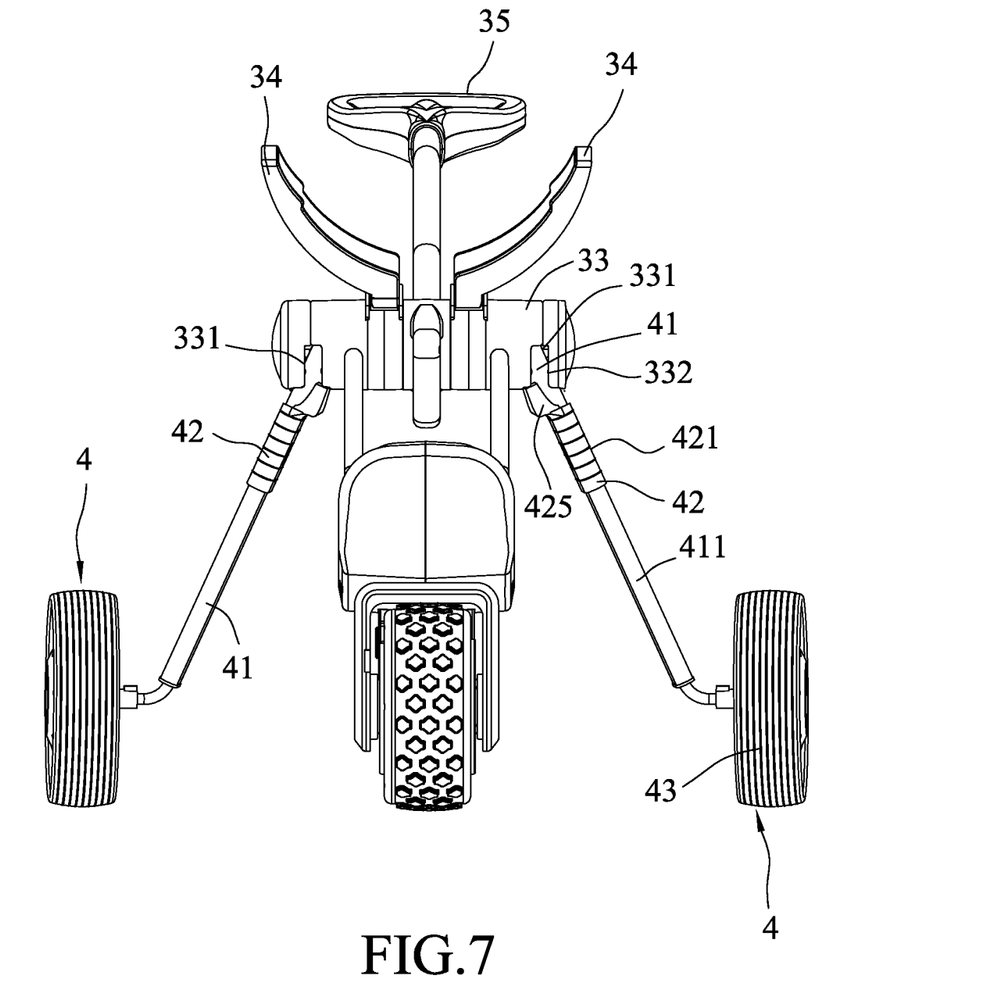
FIG. 7 is a front view illustrating disengagement between positioning members of the rear wheel mechanisms and the connecting seat of the preferred embodiment of the foldable golf bag cart.
Figure 8:
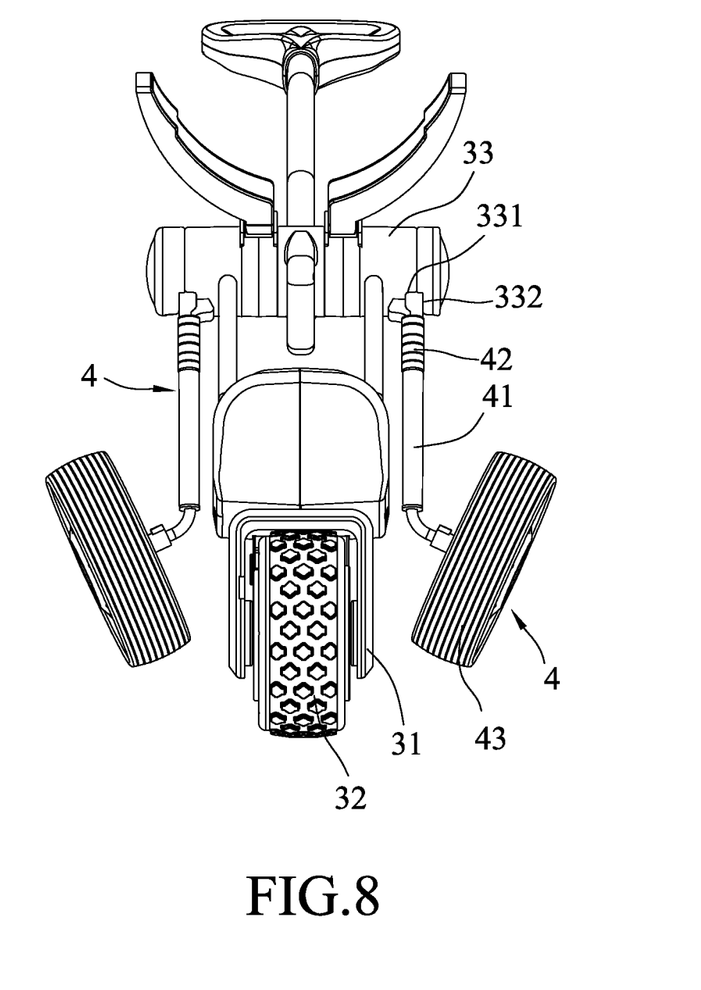
FIG. 8 is a front view of the preferred embodiment of the foldable golf bag cart in a folded state.
Figure 9:
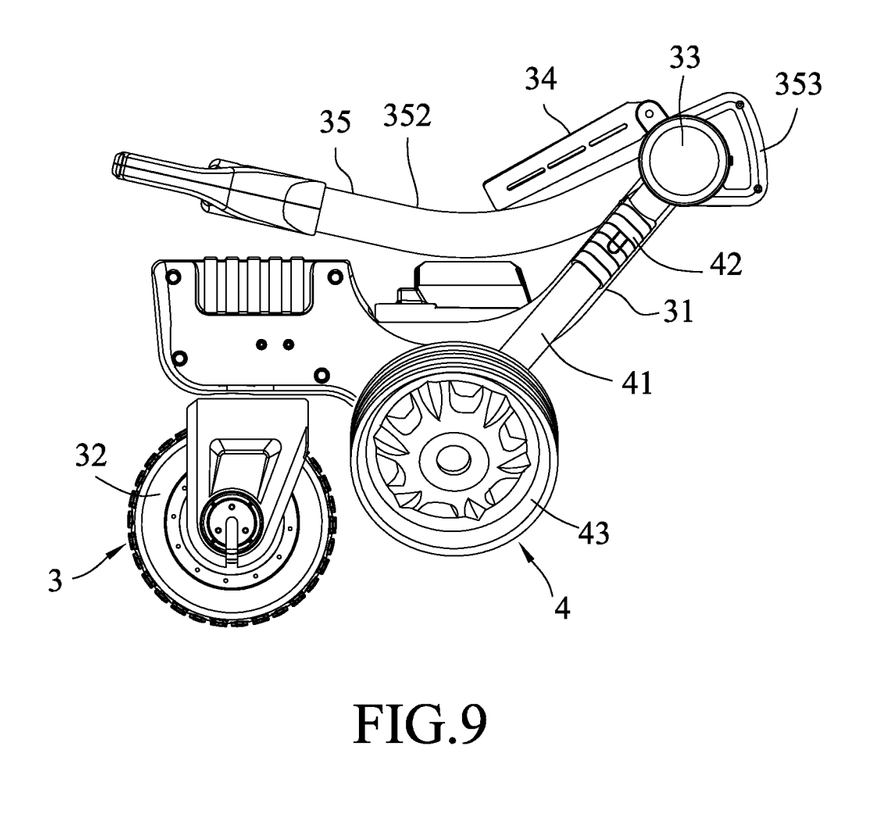
FIG. 9 is a side view of the preferred embodiment of the foldable golf bag cart in the folded state.

Referring to FIGS. 7 to 9, when each of the rear wheel mechanisms 4 is required to be folded from the unfolded state, the tubular leg body 411 of each rear wheel mechanism 4 is pulled downwardly from the connecting seat 33 to move the positioning member 42 of the corresponding one of the rear wheel mechanisms 4. The engaging section 425 of the positioning member 42 is downwardly disengaged from the insert section 334 of the corresponding one of the swing holes 331. The resilient engaging portion 424 of the positioning member 42 of the corresponding one of the rear wheel mechanisms 4 is disengaged from the selected one of the positioning holes 412 and moved toward the other one of the positioning holes 412. In order to enable the tubular leg body 411 to be in the swing section 332 of a corresponding one of the swing holes 331, the tubular leg body 411 is pushed past the limit protrusions 338 and moved toward the cart frame 31. Accordingly, the rear wheel mechanisms 4 are able to be disposed in a folded state. When each of the rear wheel mechanisms 4 is required to be in the unfolded state, the tubular leg body 411 of each of the rear wheel mechanisms 4 is moved toward the bottom part of the swing section 332 oppositely of the abutment section 333, such that the engaging section 425 of the positioning member 42 of each rear wheel mechanism 4 is engaged in the insert section 334 and such that the rear wheel leg 41 of each rear wheel mechanism 4 is in the unfolded state. According to the aforesaid description, the foldable golf bag cart is easily operated.

In this preferred embodiment, the connecting seat 33 further has a seat body 335 that extends in the left-right direction and that is fixed on a rear end of the cart frame 31, and two cover bodies 336 that are respectively mounted on left and right end portions of the seat body 335 and that respectively cooperate with the left and right end portions of the seat body 335 to define the tubular walls 33A. The pivot shaft 337 is inserted in the seat body 335 and the cover body 336. Each pair of the limit protrusions 338 projects into the swing section 332 of a corresponding one of the swing holes 331 from opposite surfaces 3351, 3361 of the seat body 335 and one of the seat covers 336.

Preferably, the front wheel mechanism 3 further includes a push-pull handle 35 that is pivotally mounted on the connecting seat 33 and extends upwardly and rearwardly and that is pivotable forwardly relative to the connecting seat 33 so as to be folded over the cart frame 31. The push-pull handle 35 has a pivot portion 351 that is pivotally mounted on the seat body 335, a push rod portion 352 that is connected to the pivot portion 351, that extends upwardly and rearwardly and that is pivotable forwardly relative to the connecting seat 33 so as to be folded over the cart frame 31, and a grip portion 353 that is connected to the pivot portion in proximity to the connecting seat 33. When the push rod portion 352 is folded over the cart frame 31, the grip portion 353 is pivotable rearwardly relative to the connecting seat 33 and distal from the front wheel 32.

Preferably, the front wheel mechanism 3 further includes two left and right retaining rods 34 that are mounted on the seat body 335 of the connecting seat 33, that are inclined upwardly and forwardly and that extend curvedly and oppositely in the left-right direction. The left and right retaining rods 34 are pivotable forwardly relative to the connecting seat 33 so to be folded over the cart frame 31. To prevent the golf bag from falling, the golf bag is clamped by the left and right retaining rods 34 in the right-left direction and put between the cart frame 31 and the connecting seat 33.

In this preferred embodiment, the foldable golf bag cart further comprises a driving mechanism 5 that drives rotation of the front wheel 32. The driving mechanism 5 includes a driver 51 that is mounted on the cart frame 31 and that connects to the front wheel 32 to drive rotation of the front wheel 32, and a battery module 52 that is mounted on the cart frame 31 and that is electrically coupled to the driver 51. The battery module 52 supplies power to the driver 51 such that the driver 51 is operable. Since the feature of this invention does not reside in the configuration of the driving mechanism 5, which may be readily appreciated by those skilled in the art, details of the same are omitted herein for the sake of brevity.

As shown in FIGS. 1 to 3, when the golf bag cart is in the unfolded state, the push rod portion 352 of the pull-push handle 35 extends upwardly and rearwardly and the left and right rods 34 are inclined upwardly and forwardly relative to the connecting seat 33. In the unfolded state of the rear wheel mechanisms 4, the golf bag is put between the cart frame 31 and the connecting seat 33 such that the left and right rods 34 clamp the golf bag. In use, the front wheel 32 may be driven by the driver 51, and the pull-push handle 35 may direct movement of the golf bag cart.

As shown in FIGS. 8 and 9, when the golf bag cart is in the folded state, the push rod portion 352 and the left and right rods 34 are folded over the cart frame 31, respectively. In the folded state of the rear wheel mechanisms 4, the push-pull handle 35 is folded over the cart frame 31 such that the grip portion 353 is easily pulled to move the golf bag cart. Since the rear wheel mechanisms 4, the left and right rods 34 and the push rod portion 352 are folded in proximity to the cart frame 31, the golf bag cart has a relatively small size to facilitate storage and transport.

To sum up, by virtue of a structural engagement design between the front wheel mechanism 3 and the rear wheel mechanisms 4, the rear wheel mechanisms 4 are facilely folded relative to the front wheel mechanism 3. Therefore, the golf bag cart has a simplified structure to not only to reduce the fabrication cost, but also to be easily operated between the folded and unfolded states in a short amount of time, thereby achieving the object of the present invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A foldable golf bag cart comprising:
a front wheel mechanism including a cart frame having a front wheel, and a connecting seat mounted on said cart frame rearwardly of said front wheel, said connecting seat having two spaced-apart left and right tubular walls disposed respectively at left and right sides of said cart frame, two interior pivot holes respectively defined by said left and right tubular walls, and two swing holes respectively extending through said left and right tubular walls and being communicated with said interior pivot holes, each of said swing holes having a swing section that extends arcuately from a bottom part to a front part of a corresponding one of said left and right tubular walls, an abutment section that opens downward and that communicates with one side of a bottom part of said swing section, and an insert section that opens downward and that communicates with another side of said bottom part of said swing section oppositely of said abutment section, said abutment sections of said swing holes being proximate to said left and right sides of said cart frame, respectively, said insert sections being disposed between said abutment sections; and
a pair of rear wheel mechanisms each of which includes a rear wheel leg that has an upper portion inserted pivotally into one of said interior pivot holes through a corresponding one of said swing holes, a positioning member that is movably mounted on said rear wheel leg to move upward or downward and that is releasably insertable into said insert section of the corresponding one of said swing holes, and a rear wheel attached to said rear wheel leg;
wherein, when said positioning member is moved upward and wedged in said insert section of the corresponding one of said swing holes, said rear wheel leg is pushed to incline sidewardly and into said abutment section of the corresponding one of said swing holes so that said rear wheel leg is prevented from moving forwardly and rearwardly;
wherein, when said positioning member is moved downward and is disengaged from said insert section of the corresponding one of said swing holes, said rear wheel leg extends into said swing section and is movable forwardly to a folded position.

2. The foldable golf bag cart as claimed in claim 1, wherein said positioning member of each of said rear wheel mechanisms has an adjusting section that is slidably sleeved around an outer surface of said rear wheel leg of a corresponding one of said rear wheel mechanisms, and an engaging section that is eccentrically disposed at and outwardly protruded from a top end of said adjusting section and that is able to be inserted in said insert section of a corresponding one of said swing holes, said rear wheel leg of each of said rear wheel mechanisms being pushed to incline sidewardly and into said abutment section when said engaging section is engaged in said insert section.

3. The foldable golf bag cart as claimed in claim 2, wherein said connecting seat further includes a pivot shaft that extends in the left-right direction and that is inserted through said interior pivot holes, said rear wheel leg of each of said rear wheel mechanisms including a tubular leg body that is upwardly inserted in the corresponding one of said swing holes and a corresponding one of said interior pivot holes, and a universal joint bearing that is mounted on top of said tubular leg body and that is swingably sleeved around said pivot shaft, said tubular leg body having two positioning holes that are indented in an outer surface of said tubular leg body and that are spaced apart from each other in a lengthwise direction of said tubular leg body, said adjusting section of said positioning member of each of said rear wheel mechanisms having a sleeve portion that is slidably sleeved around said outer surface of said tubular leg body of said rear wheel leg of a corresponding one of said rear wheel mechanisms and that has an opening exposing outwardly said positioning holes, and a resilient engaging portion that extends into said opening to engage releasably a selected one of said positioning holes.

4. The foldable golf bag cart as claimed in claim 3, wherein said connecting seat further has two pairs of limit protrusions, each pair of said limit protrusions projecting oppositely and into said swing section of a corresponding one of said swing holes, said tubular leg body of each of said rear wheel mechanisms being movable past said limit protrusions when being pushed to pivot forwardly to reach said folded position, said limit protrusions preventing rearward pivoting movement of said tubular leg body from said folded position.

5. The foldable golf bag cart as claimed in claim 4, wherein said connecting seat further has a seat body that extends in the left-right direction and that is fixed on a rear end of said cart frame, and two cover bodies that are respectively mounted on left and right end portions of said seat body and that respectively cooperate with said left and right end portions of said seat body to define said tubular walls, said pivot shaft being inserted in said seat body and said cover bodies, each pair of said limit protrusions respectively projecting into said swing section of a corresponding one of said swing holes from opposite surfaces of said seat body and one of said cover bodies.

6. The foldable golf bag cart as claimed in claim 3, wherein said tubular leg body of each of said rear wheel mechanisms further has an indented region that is indented in said outer surface of said tubular leg body, said positioning holes being formed in said indented region, said indented region permitting said resilient engaging portion to slide therein and to move between said positioning holes.

7. The foldable golf bag cart as claimed in claim 2, wherein said abutment section of each of said swing holes has a width that is measured from said swing section in a left-right direction and that is increased gradually from an inner surface to an outer surface of a corresponding one of said left and right tubular walls, said insert section of each of said swing holes having a width that is measured from said swing section in the left-right direction and that is decreased from said inner surface to said outer surface of the corresponding one of said left and right tubular walls, said engaging section of said positioning member having a top end distal from said adjusting section and a width that is measured from said top end of said engaging section in the left-right direction and that is increased gradually and downwardly from said top end of said engaging section, said width of said insert section at said outer surface of the corresponding one of said left and right tubular walls being smaller than said width of said engaging section at said top end of said engaging section.

8. The foldable golf bag cart as claimed in claim 1, wherein said front wheel mechanism further includes a push-pull handle that is pivotally mounted on said connecting seat and extends upwardly and rearwardly and that is pivotable forwardly relative to said connecting seat so as to be folded over said cart frame.

9. The foldable golf bag cart as claimed in claim 8, wherein said front wheel mechanism further includes left and right retaining rods that are mounted on said connecting seat, that are inclined upwardly and forwardly and that extend curvedly and oppositely in the left-right direction, said left and right retaining rods being pivotable forwardly relative to said connecting seat so to be folded over said cart frame.

10. The foldable golf bag cart as claimed in claim 1, further comprising a driving mechanism that drives rotation of said front wheel, said driving mechanism including a driver that is mounted on said cart frame and that is connected to said front wheel to drive rotation of said front wheel, and a battery module that is mounted on said cart frame and that is electrically coupled to said driver.

* * * * *